United States Patent
Derras et al.

(10) Patent No.: US 10,148,470 B1
(45) Date of Patent: Dec. 4, 2018

(54) ADAPTIVE MIMO CHANNEL EQUALIZATION AND DETECTION

(71) Applicant: Seagate Technology LLC, Cupertino, CA (US)

(72) Inventors: Belkacem Derras, Longmont, CO (US); Raman Venkataramani, Longmont, CO (US); William M. Radich, Longmont, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/674,703

(22) Filed: Aug. 11, 2017

(51) Int. Cl.
   *H04L 25/03* (2006.01)
   *H04B 7/0413* (2017.01)

(52) U.S. Cl.
   CPC ..... *H04L 25/03968* (2013.01); *H04B 7/0413* (2013.01); *H04L 25/03019* (2013.01); *H04L 25/03993* (2013.01)

(58) Field of Classification Search
   CPC ......... H04L 25/03968; H04L 25/03019; H04L 25/03993; H04B 7/0413
   USPC ....................................... 375/232
   See application file for complete search history.

(56) References Cited

U.S. PATENT DOCUMENTS

| | | | |
|---|---|---|---|
| 7,620,424 B2 | 11/2009 | Cetiner et al. |
| 7,936,843 B2 | 5/2011 | Zhou et al. |
| 8,031,678 B2 | 10/2011 | Priotti et al. |
| 8,095,854 B2 | 1/2012 | Eroz et al. |
| 8,102,947 B2 | 1/2012 | Eroz et al. |
| 8,145,980 B2 | 3/2012 | Eroz et al. |
| 8,230,312 B1 | 7/2012 | Yeo et al. |
| 8,340,206 B2 | 12/2012 | Martin et al. |
| 8,392,793 B2 | 3/2013 | Eroz et al. |
| 8,433,258 B2 | 4/2013 | Luo et al. |
| 8,467,467 B2 | 6/2013 | Lee et al. |
| 8,473,819 B2 | 6/2013 | Kershaw et al. |
| 8,522,123 B1 | 8/2013 | Yeo et al. |
| 8,582,223 B1 | 11/2013 | Garani et al. |
| 8,760,782 B1 | 6/2014 | Garani et al. |
| 8,767,885 B2 | 7/2014 | Sampath et al. |
| 8,819,530 B1 | 8/2014 | Yeo et al. |
| 8,971,461 B2 | 3/2015 | Sampath et al. |
| 9,154,201 B2 | 10/2015 | Mujtaba et al. |
| 9,362,933 B1 | 6/2016 | Chaichanavong |

(Continued)

OTHER PUBLICATIONS

Jaekyun Moon and Weining Zeng, "Equalization for Maximum Likelihood Detectors", IEEE Transaction on Magnetics, vol. 31, No. 2, pp. 1083-1088, Mar. 1995.

(Continued)

*Primary Examiner* — Hirdepal Singh
(74) *Attorney, Agent, or Firm* — Westman, Champlin & Koehler, P.A.

(57) ABSTRACT

A method includes receiving a data signal over a multi-input multi-output (MIMO) channel. The method further includes equalizing the data signal, by an adaptive equalizer circuit having an associated target, to provide an equalized output of the data signal. As part of the method, taps of the equalizer circuit and coefficients of the target are estimated. A constraint is imposed on the coefficients of the target as part of the estimation of the coefficients of the target. A similar minimization process is used with constraint imposed on whitening filter taps associated with a DDNP detector in the MIMO channel.

15 Claims, 10 Drawing Sheets

(56) References Cited

U.S. PATENT DOCUMENTS

| | | |
|---|---|---|
| 9,426,000 B2 | 8/2016 | Gorshtein et al. |
| 9,525,470 B1 | 12/2016 | Wu et al. |
| 2005/0181739 A1 | 8/2005 | Krasny et al. |
| 2005/0237971 A1 | 10/2005 | Skraparlis |
| 2007/0223367 A1 | 9/2007 | Wu et al. |
| 2010/0211830 A1* | 8/2010 | Sankaranarayanan ........................ G11B 20/10009 714/55 |
| 2011/0093517 A1* | 4/2011 | Liu .................. G11B 5/035 708/207 |
| 2015/0093119 A1* | 4/2015 | Gorshtein .......... H04B 10/2507 398/159 |
| 2015/0179213 A1* | 6/2015 | Liao ................ G11B 5/5526 360/65 |
| 2016/0218781 A1* | 7/2016 | Seifert ................ H04B 7/0417 |
| 2016/0344459 A1 | 11/2016 | Chen et al. |
| 2017/0288915 A1* | 10/2017 | Aravind ............ H04L 25/03057 |
| 2017/0330593 A1* | 11/2017 | Higashino ........ G11B 20/10055 |

OTHER PUBLICATIONS

Raman Venkataramani and Sundararajan Sankaranarayanan, "Optimal Channel Shortening Equalization for MIMO ISI Channels," IEEE GLOBECOM 2008 Conference, pp. 1-5, Jan. 2008.

Aleksandar Kavcic and Jose M.F. Moura, "The Viterbi Algorithm and Markov Noise Memory," IEEE Trans Information Theory, vol. 46, pp. 291-301, Jan. 2000.

Jaekyun Moon and Jongseung Park, "Pattern-Dependent Noise Prediction in Signal-Dependent Noise," IEEE Journal on Selec. Areas in Comm., vol. 19, pp. 730-743, Apr. 2001.

Raman Venkataramani, "DDNP Training Without the Use of a Target", Seagate Internal Report, Feb. 29, 2012. p. 3 of 7.

Raman Venkataramani, "Adaptive DDNP Calibration", Seagate Internal Report, Apr. 21, 2011.

Jorge Nocedal and Stephen J. Wright, Numerical Optimization, Springer, Second Edition, 2006.

* cited by examiner

ADAPTIVE MIMO CHANNEL EQUALIZATION AND DETECTION

BACKGROUND

Data communication channels are used to transmit and receive information in an efficient and reliable manner. Such channels are utilized in a variety of applications from wireless communication networks, such as mobile cellular and satellite communication systems to computer data storage devices, such as hard disk drives. When data is transmitted over a channel, unwanted phenomena such as inter-symbol interference (ISI), which is a form of distortion of a signal in which one symbol interferes with previous and/or subsequent symbols, may occur, thereby making the communication less reliable. Equalization and detection are signal processing operations that are used to fully or partially remove ISI and recover the original information symbols (e.g., bits).

SUMMARY

The present disclosure generally relates to equalization and detection in multi-input multi-output (MIMO) channels using an adaptive scheme.

In one embodiment, a method includes receiving a data signal over a MIMO channel. The method further includes equalizing the data signal, by an adaptive equalizer circuit having an associated target, to provide an equalized output of the data signal. As part of the method, taps of the equalizer circuit and coefficients of the target are estimated. A constraint is imposed on the coefficients of the target as part of the estimation of the coefficients of the target.

In another embodiment, a method includes receiving a data signal over a MIMO channel. The method further includes equalizing the data signal, by an adaptive equalizer circuit having an associated target, to provide an equalized output of the data signal. The equalized output is provided to a detector circuit from which detected symbols are obtained. As part of the method, whitening filter taps associated with the detector circuit are estimated. A constraint is imposed on a leading whitening filter tap as part of the estimation of the whitening filter taps.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments of the disclosure generally relate to equalization and detection in multi-input multi-output (MIMO) channels using an adaptive scheme. However, prior to providing additional details regarding the different embodiments, a description of an illustrative operating environment is provided below in connection with FIGS. 1 and 2.

Figure 1:
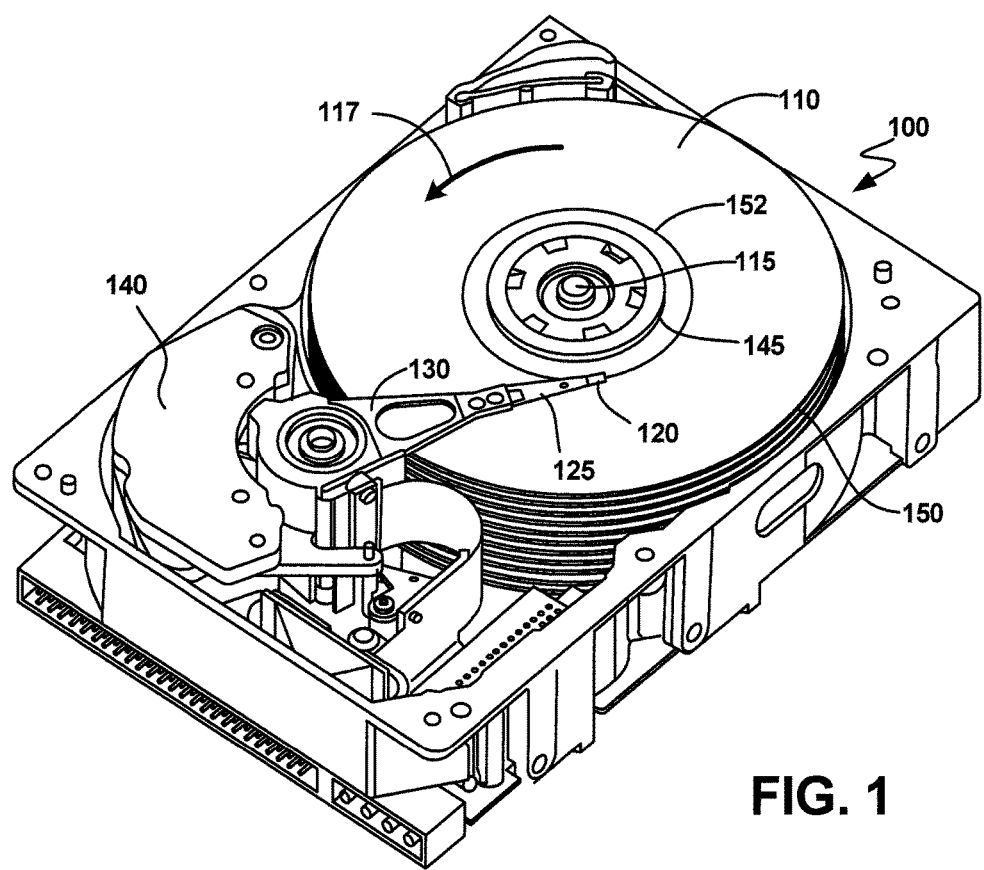
FIG. 1 is a perspective view of a data storage system.
Figure 2:
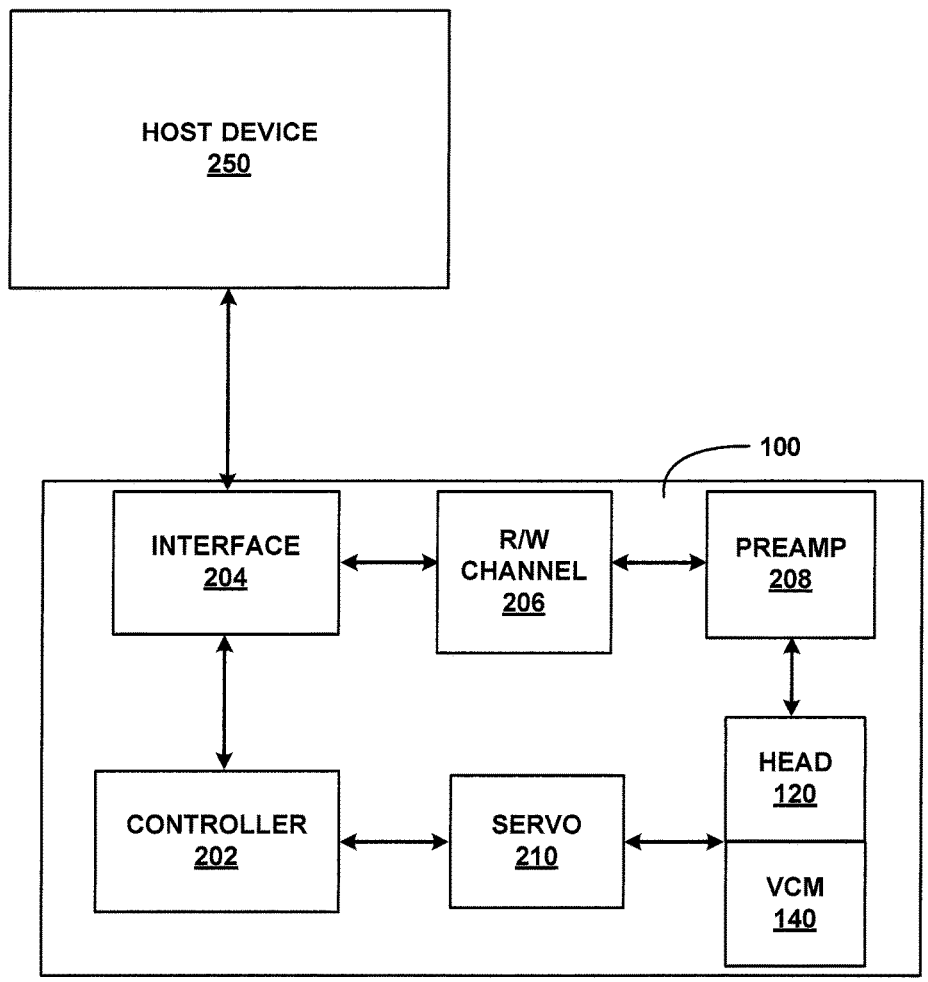
FIG. 2 is a generalized functional block diagram of a data storage system.

FIGS. 1 and 2 together show an illustrative operating environment in which certain embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disk drive 100. Hard disk drives are a common type of data storage system. While embodiments of this disclosure are described in terms of disk drives, other types of data storage systems should be considered within the scope of the present disclosure. The same reference numerals are used in different figures for same or similar elements.

Disk drive 100 includes a data storage medium (for example, a magnetic disk) 110. Those skilled in the art will recognize that disk drive 100 can contain a single platter or multiple platters. Medium 110 is mounted on a spindle motor assembly 115 that facilitates rotation of the medium about a central axis. An illustrative direction of rotation is shown by arrow 117. Each disk surface has an associated recording head 120 that carries a read transducer and a write transducer for communication with the surface of the disk. Each head 120 is supported by a head gimbal assembly 125. Each head gimbal assembly (HGA) 125 illustratively includes a suspension and a HGA circuit. Each HGA circuit provides electrical pathways between a recording head and associated hard disk drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disk inner diameter 145 and a disk outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3:
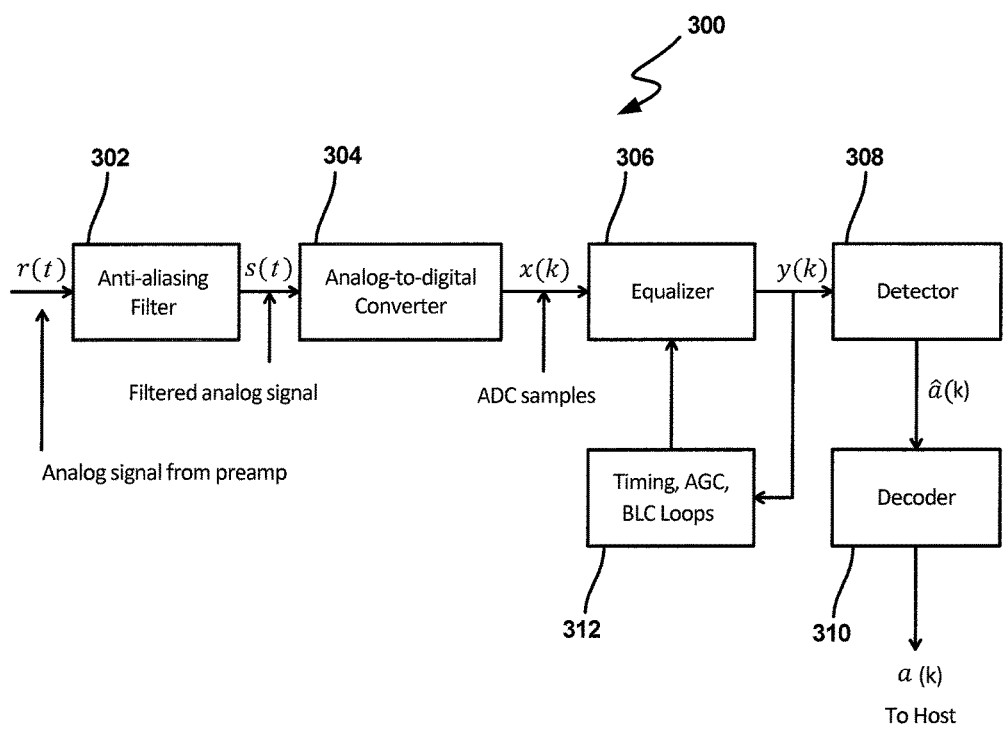
FIG. 3 is a block diagram of a read portion of read/write channel shown in FIG. 2.

FIG. 3 is a block diagram of a read portion 300 of read/write channel 206 of FIG. 2. Read channel portion 300 of FIG. 3 includes an anti-aliasing filter 302, an analog-to-digital converter (ADC) 304, an equalizer 306, a detector 308 and a decoder 310. Also included are a timing control loop, an automatic gain control (AGC) loop and a baseline compensation (BLC) loop. Those loops are represented by a single box 312 in FIG. 3.

During a read operation in disk drive 100 (of FIG. 1), the read transducer within head 120 (of FIGS. 1 and 2) senses or detects, for example, magnetization patterns on medium 110 of FIG. 1. Detected signals from the read transducer are provided to preamp 208 (of FIG. 2), which amplifies the detected signal(s). An analog signal from the preamp 208 (denoted by r(t) in FIG. 3) is provided to anti-aliasing filter 302, which filters r(t) to remove certain undesired components of r(t), and outputs a filtered analog signal s(t). Analog signal s(t) is digitized by ADC 304, which outputs ADC samples x(k). Samples x(k) are input into equalizer 306, which removes/undoes at least some of the inter-symbol interference (ISI) in x(k) and provides an equalized output y(k) to detector 308. In response to receiving y(k), detector 308 provides a best estimate of channel input symbols â(k). Symbols â(k) are input into decoder 310, which provides a decoded output a(k) that is sent to a host device such as 250 of FIG. 2.

In different applications, different types of read channels may be used (e.g., single-input single-output (SISO) channels, multi-input multi-output (MIMO) channels, etc.). For example, in applications in which disk drive 100 (of FIG. 1) has a recording head 120 (of FIG. 1) that carries a read transducer (not separately shown) that includes a single sensor (not separately show) for sensing bit magnetizations from a desired track such as 152 on medium 110 (of FIG. 1), a SISO read channel may be used to process the read signal from the single sensor.

In embodiments of the disclosure, read channel portion 300 is a MIMO channel. Such a MIMO channel may be suitable when, for example, recording head 120 of disk drive 100 carries a read transducer that includes multiple sensors (not separately shown) that substantially simultaneously sense bit magnetizations form track 152 and possibly from tracks adjacent to track 152. Here, MIMO channel portion 300 can substantially simultaneously process signals from the multiple sensors.

As noted above, equalization and detection are signal processing operations that are used to fully or partially remove the effect of inter-symbol interference (ISI) introduced by a communication channel and recover the original information symbols (e.g., bits). In case the equalization is intended to partially undo the ISI effect, it is referred to as partial response (PR) equalization, in which case the target response is either given or is to be estimated along with equalizer taps. In the latter case, the equalization is called generalized partial response (GPR) equalization. The description below provides examples of adaptive algorithms or procedures for MIMO channels, which include a GPR equalizer and a data-dependent noise prediction soft-output Viterbi algorithm (DDNP-SOVA) detector. When the target (e.g., target filter) associated with the equalizer is known, an adaptive MIMO equalizer algorithm may be a simple extension of a single-input single-output (SISO) equalizer algorithm. However, for the GPR case, the target is unknown and therefore, in embodiments of the disclosure, a minimization criterion employs a constraint on the target to avoid a trivial solution. In the context of the DDNP-SOVA detector, the same constraint may be applied to each DDNP whitening filter. To incorporate the constraint within the adaptation process, a second minimization criterion that enforces the constraint is used alongside an original mean square error (MSE) criterion for the equalizer and a branch metric criterion for the DDNP detector. As will be described further below, the two criteria (original and secondary) are then minimized simultaneously. Prior to providing a description of the algorithms that are used in MIMO channels, a description of SISO GPR equalization is provided in connection with FIG. 4.

Figure 4:
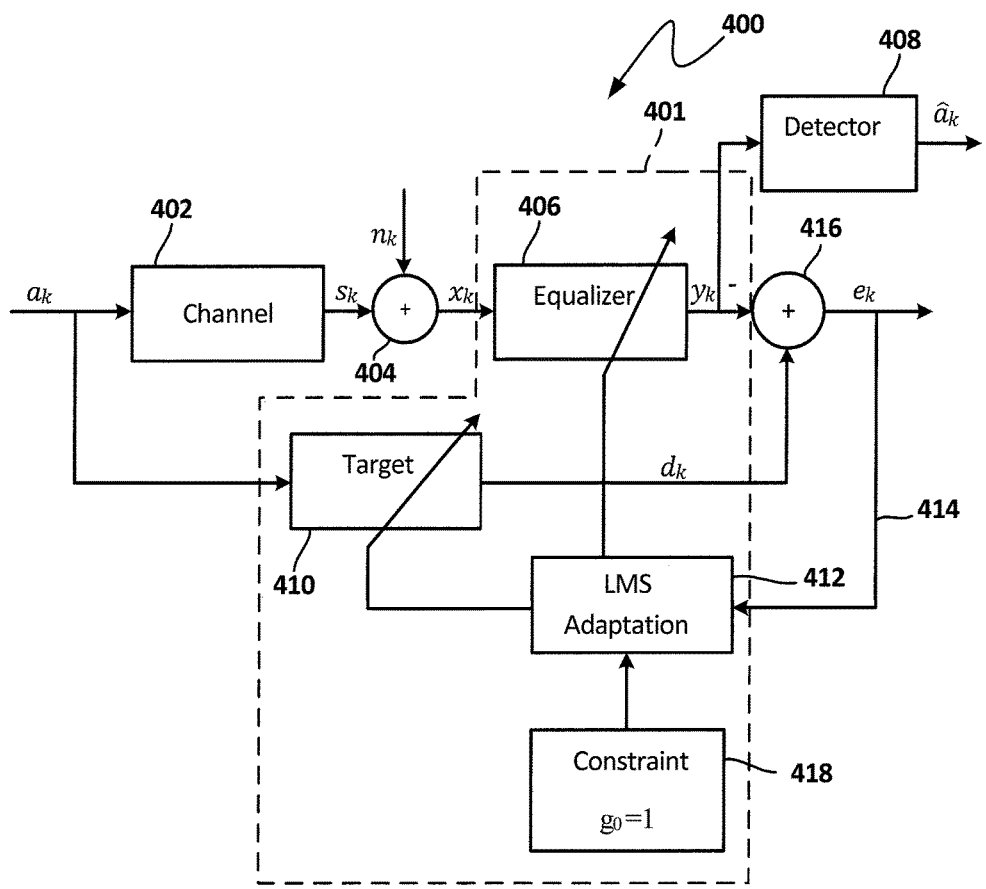
FIG. 4 is block diagram that includes an example of single-input single-output (SISO) generalized partial response (GPR) equalization circuitry.

FIG. 4 is block diagram 400 that includes an example of SISO GPR equalization circuitry 401. In FIG. 4, $a_k$ represents a SISO channel input sequence (e.g., data written on a data storage medium such as 110 of FIG. 1) and SISO channel portion 402 may represent read processes for obtaining data from the data storage medium. In FIG. 4, $s_k$ represents a noiseless output from SISO channel portion and $n_k$ represents channel additive noise, which is combined with $s_k$ at node 404 to provide a noisy SISO channel output $x_k$, which contains ISI. Signal $x_k$ is fed to an adaptive SISO equalizer circuit 406, which at least partially removes the ISI from signal $x_k$ and provides an equalized output $y_k$. SISO equalizer output $y_k$ is provided to detector 408. Detector 408 provides an output $â_k$, which may be a best estimate of channel input symbols $a_k$. The example of FIG. 4 also includes a SISO target 410 which receives channel input sequence $a_k$ and outputs a desired sequence $d_k$. An adaptation or algorithm used to estimate/update filter taps of SISO equalizer 406 and coefficients of target 410 may be a least mean square (LMS) adaptation 412, which utilizes an error input $e_k$ that is a function of the equalizer output $y_k$ and the desired sequence $d_k$ (as can be seen in feedback loop portion 414 and summing node 416). A constraint that may be introduced into the SISO LMS adaptation is denoted by reference numeral 418 in FIG. 4.

The equalizer 406 may be a finite impulse response (FIR) type filter with M taps (for convenience, M is assumed to be odd) and the target 410 has $L_g$ coefficients. In this type of equalization, a mean square error (MSE) functional may be expressed as $$J(f,g) = E[(d_k - y_k)^2] \qquad \text{Equation 1}$$

where E denotes an expected value and $$d_k = \sum_{i=0}^{L_g-1} g_i a_{k-i} = g^T a_k \qquad \text{Equation 2}$$

and $$y_k = \sum_{i=-(M-1)/2}^{(M-1)/2} f_i x_{k-i} = f^T x_k \qquad \text{Equation 3}$$

are the desired and the equalized signals, respectively. The vectors g and f hold the target coefficients and the equalizer taps, respectively $$g = (g_0 \ldots g_{L_g-1})^T \qquad \text{Equation 4}$$

$$f = (f_{-(M-1)/2} \ldots f_0 \ldots f_{(M-1)/2})^T \qquad \text{Equation 5}$$

The vectors $a_k$ and $x_k$ are data vectors of dimensions $L_g \times 1$ and $M \times 1$, holding bit patterns and ADC samples, respectively $$a_k = (a_k a_{k-1} \ldots a_{k-L_g+1})^T \qquad \text{Equation 6}$$

$$x_k = (x_{k+(M-1)/2} \ldots x_0 \ldots x_{k-(M-1)/2})^T \qquad \text{Equation 7}$$

Expanding Equation 1 results in $$J(f,g) = g^T R_a g + f^T R_x f - g^T R_{ax} f - f^T R_{xa} g \qquad \text{Equation 8}$$

where $R_a = E(a_k a_k^T)$, $R_x = E(x_k x_k^T)$, $R_{ax} = E(a_k x_k^T)$, and $R_{xa} = E(x_k a_k^T)$ are the auto- and cross-covariance matrices of the data vectors $a_k$ and $x_k$. It is known that $R_{ax} = R_{xa}^T$.

From the foregoing, it is clear that a trivial solution $f = g = 0$ results from minimizing Equation 8. Therefore, a constraint may be added to Equation 8 to avoid the trivial solution. The constraint may be to make the target monic (e.g., make the target's leading coefficient, $g_0$, be unity). In this case, after adding the Lagrange multiplier term, Equation 8 becomes $$J_c(f,g,\lambda) = g^T R_a g + f^T R_x f - g^T R_{ax} f - f^T R_{xa} g - 2\lambda(u^T g - 1) \qquad \text{Equation 9}$$

where $\lambda$ is the Lagrange multiplier and $u = (1\ 0\ \ldots\ 0)^T$ is a unit vector indicating the coefficient of g to be constrained. The minimization of Equation 9 with respect to f, g, and $\lambda$ leads to the following expressions $$\lambda = \frac{1}{u^T (R_a - R_{ax} R_x^{-1} R_{xa})^{-1} u} \qquad \text{Equation 10a}$$

$$g = \lambda (R_a - R_{ax} R_x^{-1} R_{xa})^{-1} u \qquad \text{Equation 10b}$$

$$f = R_x^{-1} R_{xa} g \qquad \text{Equation 10c}$$

The solutions given by Equations 10a-10c are minimum mean square error (MMSE)/Wiener-type solutions, where covariance matrices are estimated before computing the underlying parameters f, g, and $\lambda$. In a real-time implementation, Equations 10a-10c are highly complex and their implementation cost is prohibitive. To address such a difficulty, an adaptive algorithm may be used to minimize Equation 9 and to estimate the underlying parameters. In general, a simpler way of handling the constraints is to use a second criterion in addition to Equation 8. For instance, the second criterion corresponding to the constraint $u^T g = 1$ may be given by $$L(g) = (u^T g - 1)^2 \qquad \text{Equation 11}$$

However, since the constraint here is simply imposing $g_0 = 1$, the adaptive algorithm may be derived using the unconstrained criterion, and then the updated expressions will exclude the parameters involved in the constraints as shown below.

To derive the adaptive expressions for f and g, an instantaneous version of Equation 8 may be used $$J_{inst}(f,g) = g^T a_k a_k^T g + f^T x_k x_k^T f - g^T a_k x_k^T f - f^T x_k a_k^T g \qquad \text{Equation 12}$$

The gradients of Equation 12 with respect to f and g take the form $$\frac{\partial J_{inst}(f,g)}{\partial f} = 2 x_k x_k^T f - 2 x_k a_k^T g = 2x(y_k - d_k) \qquad \text{Equation 13a}$$
$$= -2 x e_k$$

$$\frac{\partial J_{inst}(f,g)}{\partial g} = 2 a_k a_k^T g - 2 a_k x_k^T f = 2 a_k (d_k - y_k) \qquad \text{Equation 13b}$$
$$= 2 a_k e_k$$

where $$e_k = d_k - y_k \qquad \text{Equation 14}$$

is the error between the desired and the equalized signals.

Using Equation 13a, an LMS adaptive expressions for f may be obtained as $$f^{(k)} = f^{(k-1)} + \mu_f \left( -\frac{\partial J_{inst}(f,g)}{\partial f} \right)_{f = f^{(k-1)}} = f^{(k-1)} + \mu_f x_k e_k \qquad \text{Equation 15}$$

Since $g_0 = 1$, it may be excluded from the adaptation by using $$\tilde{g}^{(k)} = \tilde{g}^{(k-1)} + \mu_g \left( -\frac{\partial J_{inst}(f,g)}{\partial \tilde{g}} \right)_{\tilde{g} = \tilde{g}^{(k-1)}} = \tilde{g}^{(k-1)} + \mu_g \tilde{a}_k e_k \qquad \text{Equation 16a}$$

$$\tilde{g} = (g_1\ g_2\ \ldots\ g_{L_g - 1})^T \qquad \text{Equation 16b}$$

$$\tilde{a}_k = (a_{k-1}\ \ldots\ a_{k-L_g+1})^T \qquad \text{Equation 16c}$$

where $\mu_f$ and $\mu_g$ are the adaptation step sizes for Equation 15 and Equation 16a, respectively. Thus, the LMS adaptive algorithm for SISO GPR equalization is given by Equation 15 using Equation 16a in the adaptation of the target. The converged taps $\tilde{g}$ along with $g_0 = 1$ provide the full target g. It should be noted that, in general, constraints may be imposed on g as well as on f. Moreover, the constraints may be imposed on any taps of f or on any coefficients of g or on any appropriate function of f and/or g.

Figure 5:
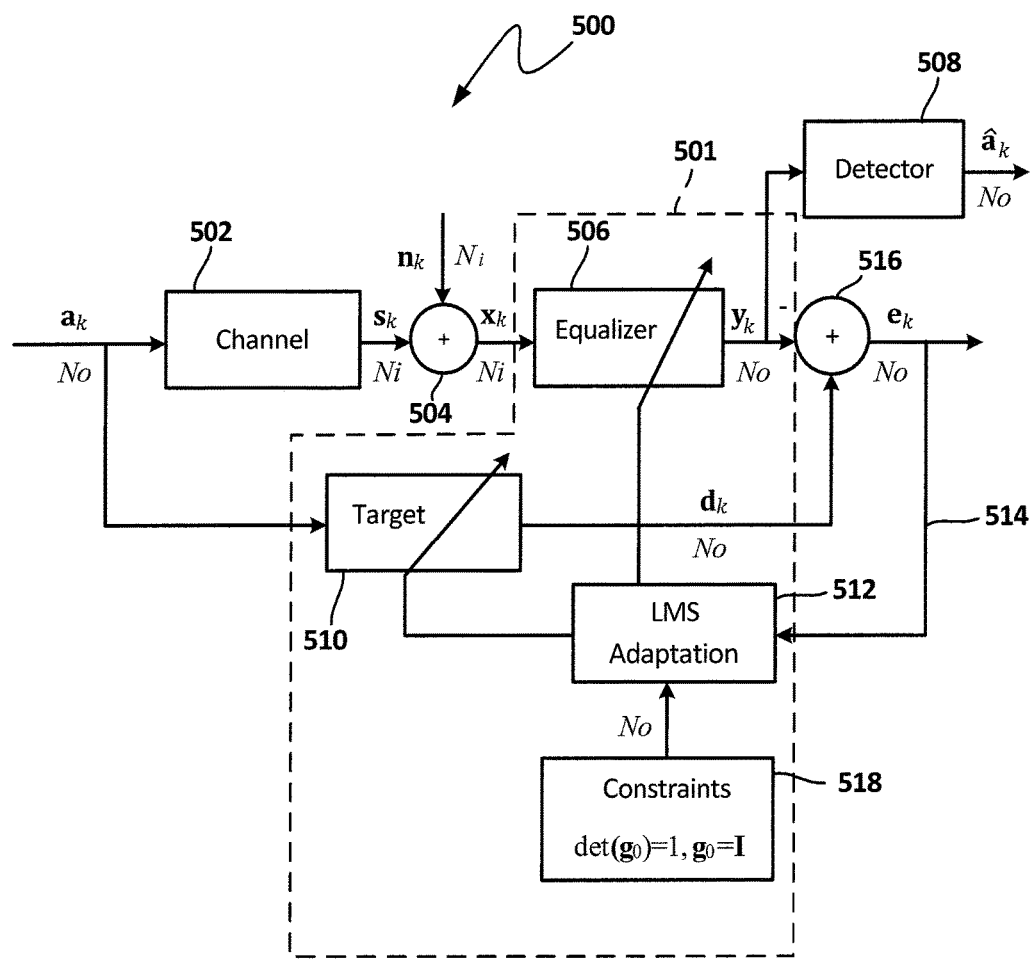
FIG. 5 is block diagram that includes an example of multi-input multi-output (MIMO) GPR equalization circuitry in accordance with one embodiment.

FIG. 5 is block diagram 500 that includes an example of multi-input multi-output (MIMO) GPR equalization circuitry 501 in accordance with one embodiment. In FIG. 5, Ni represents a number of inputs to the equalizer and No represents a number of outputs from the equalizer. In FIG. 5, $a_k$ represents a MIMO channel input sequence (e.g., data written on a data storage medium such as 110 of FIG. 1) and MIMO channel portion 502 may represent read processes for obtaining data from the data storage medium. In FIG. 5, $s_k$ represents a noiseless output from MIMO channel portion 502 and $n_k$ represents channel additive noise, which is combined with $s_k$ at node 504 to provide a noisy MIMO channel output $x_k$, which contains ISI. Signal $x_k$ is fed to an adaptive MIMO GPR equalizer circuit 506, which at least partially removes the ISI from signal $x_k$ and provides an equalized output $y_k$. MIMO equalizer output $y_k$ is provided to detector 508. Detector 508 provides an output $\hat{a}_k$, which may be a best estimate of MIMO channel input symbols $a_k$. The example of FIG. 5 also includes a MIMO target 510 which receives channel input sequence $a_k$ and outputs a desired sequence $d_k$. An adaptation employed to estimate/update filter taps of adaptive MIMO equalizer circuit 506 and coefficients of MIMO target 510 may be a MIMO LMS adaptation 512, which utilizes an error input $e_k$ that is a function of the MIMO equalizer output $y_k$ and the desired sequence $d_k$ (as can be seen in feedback loop portion 514 and summing node 516). Constraints that may be introduced into the MIMO LMS algorithm are denoted by reference numeral 518 in FIG. 5. Examples of such constraints are described further below.

As noted above, Ni represents the number of inputs to the adaptive MIMO equalizer circuit 506 and No represents the number of outputs from the adaptive MIMO equalizer circuit 506. In a hard disk drive system such as 100 of FIG. 1, Ni may be a number of reads (e.g., a number of read signals provided by multiple read sensors) and No may be a number of tracks read by the multiple read sensors. In some embodiments, Ni may be equal to No. The outputs of the adaptive MIMO equalizer are given by $$y_k = \sum_{i=-(M-1)/2}^{(M-1)/2} f_i x_{k-i} \qquad \text{Equation 17}$$

where the taps $f_i$, $i=-(M-1)/2, \ldots, (M-1)/2$ are matrices of dimension No×Ni, $x_k=(x_{1,k}, x_{2,k}, \ldots, x_{Ni,k})^T$ is an input data vector at time k of dimension Ni×1, and $y_k=(y_{1,k}, y_{2,k}, \ldots, y_{No,k})^T$ is a corresponding output vector at time k of dimension No×1, containing the equalized samples. The desired signals are given by $$d_k = \sum_{i=0}^{L_g-1} g_i a_{k-i} \qquad \text{Equation 18}$$

where the taps $g_i$, $i=0, \ldots, L_g-1$, are matrices of dimension No×No, $a_k=(a_{1,k}, a_{2,k}, \ldots, a_{No,k})^T$ is a bit pattern vector at time k of dimension No×1, and $d_k=(d_{1,k}, d_{2,k}, \ldots, d_{No,k})^T$ is a corresponding desired vector at time k of dimension No×1, containing the desired samples. An objective is to minimize the MSE functional of the error $e_k=d_k-y_k$, e.g.

$$J(F,G)=\text{Trace}[E(e_k^2)] \qquad \text{Equation 19}$$

where $$F=(f_{-(M-1)/2} \ldots f_0 \ldots f_{(M-1)/2}) \qquad \text{Equation 20a}$$

$$G=(g_0 \ldots g_{L_g-1}) \qquad \text{Equation 20b}$$

As noted earlier in connection with SISO equalization, a constraint may be added to Equation 8 to avoid a trivial solution. Similarly, a trivial solution may be prevented in MIMO equalization by adding a constraint to Equation 19. Example constraints that may be used for the MIMO case are $\det(g_0)=1$ or $g_0=I$, where $\det(.)$ stands for determinant and I is an identity matrix of compatible dimension. Constraint $\det(g_0)=1$ may be referred to as a monic determinant constraint and $g_0=I$ may be referred to as a monic identity constraint. Other constraints may also be used depending on the objective of the equalization. Equation 19 rewritten to include the constraint $\det(g_0)=1$ is as follows:

$$J_c(F,G,\lambda)=\text{Trace}[E(e_k e_k^T)]-\lambda(\det(g_0)-1) \qquad \text{Equation 21a}$$

Equation 21a may more explicitly be rewritten as $$J_c(F,G,\lambda)=\text{Trace}(G\mathbb{R}_a G^T+F\mathbb{R}_x F^T-2F\mathbb{R}_{xa}G^T)-\lambda(\det(g_0)-1) \qquad \text{Equation 21b}$$

where $\mathbb{R}_a=E(A_k A_k^T)$, $\mathbb{R}_x=E(X_k X_k^T)$, $\mathbb{R}_{xa}=E(X_k A_k^T)$, and $$A_k(a_k^T a_{k-1}^T \ldots a_{k-L_g+1}^T)^T \qquad \text{Equation 22a}$$

$$X_k=(x_{k+(M-1)/2}^T \ldots x_0^T \ldots x_{k-(m-1)/2}^T)^T \qquad \text{Equation 22b}$$

Minimization of Equations 21a or 21b yield the following expressions for $\lambda$, F, and G $$\lambda I = g_0^T g_0 [U^T(\mathbb{R}_a-\mathbb{R}_{ax}\mathbb{R}_x^{-1}\mathbb{R}_{xa})^{-1}U]^{-1} \qquad \text{Equation 23a}$$

$$G=\lambda g_0^{-T} U^T(\mathbb{R}_a-\mathbb{R}_{ax}\mathbb{R}_x^{-1}\mathbb{R}_{xa})^{-1} \qquad \text{Equation 23b}$$

$$F=G\mathbb{R}_{ax}\mathbb{R}_x^{-1} \qquad \text{Equation 23c}$$

where $U=(I\ 0 \ldots 0)^T$ is an $L_g$No×No matrix and I is a No×No identity matrix. Equations 23a-23c are for the constraint $\det(g_0)=1$. The coefficient $g_0$ may be obtained by solving Equation 23b for $$c = \frac{g_0^T G}{\lambda} = U^T(\mathbb{R}_a-\mathbb{R}_{ax}\mathbb{R}_x^{-1}\mathbb{R}_{xa})^{-1},$$

Cholesky-factorizing the coefficient $\lambda c_0=g_0^T g_0$, and extracting $g_0$. If the constraint being used is $g_0=I$, then the criterion given by Equation 21b is modified to include the new constraint $$J_c(F,G,\lambda)=\text{Trace}(G\mathbb{R}_a G^T+F\mathbb{R}_x F^T-2F\mathbb{R}_{xa}G^T)-\text{Trace}(\Lambda(g_0-I))=\text{Trace}(G\mathbb{R}_a G^T+F\mathbb{R}_x F^T-2F\mathbb{R}_{xa}G^T)-\text{Trace}(\Lambda(GU-I)) \qquad \text{Equation 24}$$

where $\Lambda$ is a matrix of the same dimensions as $g_0$, representing the Lagrange multiplier. Minimization of Equation 24 leads to the following expressions of $\Lambda$, G, and F $$\Lambda=[U^T(\mathbb{R}_a-\mathbb{R}_{ax}R_x^{-1}\mathbb{R}_{xa})^{-1}U]^{-1} \qquad \text{Equation 25a}$$

$$G=\Lambda U^T(\mathbb{R}_a-\mathbb{R}_{ax}\mathbb{R}_x^{-1}\mathbb{R}_{xa})^{-1} \qquad \text{Equation 25b}$$

$$F=G\mathbb{R}_{ax}\mathbb{R}_x^{-1} \qquad \text{Equation 25c}$$

The adaptive algorithm for the MIMO GPR equalizer may be derived by minimizing the following instantaneous functional without any constraint $$J_{inst}(F,G)=\text{Trace}(GA_k A_k^T G^T+FX_k X_k^T F^T-2FX_k A_k^T G^T) \qquad \text{Equation 26a}$$

together with a constraint-related functional of the form $$L(g_0)=(\det(g_0)-1)^2 \qquad \text{Equation 26b}$$

The minimization of the second functional given by Equation 26b ensures that the constraint $\det(g_0)=1$ is more-or-less satisfied after convergence. The gradients of Equation 26a with respect to F and G are given by $$\frac{\partial J_{inst}(F,G)}{\partial F} = 2FX_k X_k^T - 2GA_k X_k^T = 2(FX_k - GA_k)X_k^T \qquad \text{Equation 27a}$$

$$\frac{\partial J_{inst}(F,G)}{\partial G} = 2GA_k A_k^T - 2FX_k A_k^T = -2(FX_k - GA_k)A_k^T \qquad \text{Equation 27b}$$

The gradient of Equation 26b with respect to $g_0$ is given by $$\frac{\partial L(g_0)}{\partial g_0} = 2(\det(g_0)-1)\det(g_0)g_0^{-T} \qquad \text{Equation 27c}$$

Using Equations 27a-27c, the LMS adaptive expressions may be derived to update F, G, and $g_0$ $$F^{(k)} = F^{(k-1)} + \mu_F\left(-\frac{\partial J_{inst}(F,G)}{\partial F}\right)_{F=F^{(k-1)}} = F^{(k-1)} + \mu_F e_k X_k \qquad \text{Equation 28a}$$

$$G^{(k)} = G^{(k-1)} + \mu_G\left(-\frac{\partial J_{inst}(F,G)}{\partial G}\right)_{G=G^{(k-1)}} = G^{(k-1)} - \mu_G e_k A_k \qquad \text{Equation 28b}$$

$$g_0^{(k)} = g_0^{(k-1)} + \mu_{g0}\left(-\frac{\partial L(g_0)}{\partial g_0}\right)_{g_0=g_0^{(k-1)}} = g_0^{(k-1)} - \mu_{g0}(\det(g_0)-1)\det(g_0)g_0^{-T} \qquad \text{Equation 28c}$$

The expressions given by Equations 28a-28c represent the adaptive algorithm for MIMO GPR equalization using the constraint $\det(g_0)=1$.

If a different constraint such as $g_0=I$ is employed, then Equation 28a may be used unchanged, but Equation 28b is used after excluding the leading matrix coefficient $g_0$ from the adaptation, e.g.

$$\tilde{G}^{(k)} = \tilde{G}^{(k-1)} - \mu_G e_k \tilde{A}_k^T \qquad \text{Equation 29}$$

where $$\tilde{G} = (g_1 \ldots g_{L_g-1}) \qquad \text{Equation 30a}$$

$$\tilde{A}_k = (a_{k-1}^T \ldots a_{k-L_g+1}^T)^T \qquad \text{Equation 30b}$$

Therefore, with the constraint $g_0=I$, Equation 28a and Equation 29 may be utilized for adaptive MIMO GPR equalization. Once the adaptation is completed, $g_0=I$ can be appended to $\tilde{G}$ to obtain G.

As will be described in detail below, the adaptive Equations 28a-28c for the constraint $\det(g_0)=1$ and Equations 28a and 29 for the constraint $g_0=I$ may also be utilized to estimate taps of DDNP filters in a MIMO-SOVA detector since such filters use the same constraints on the leading tap of each whitening filter.

Figure 6:
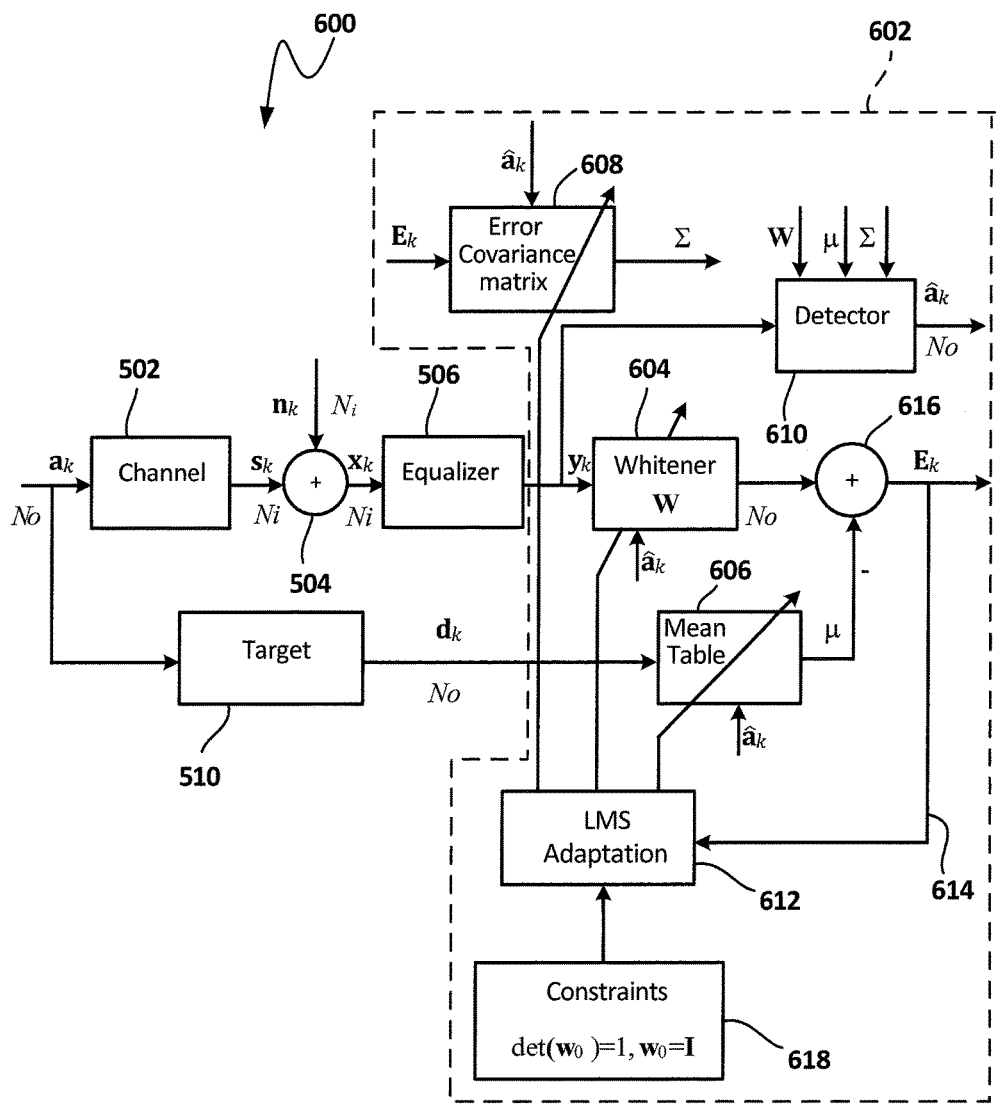
FIG. 6 is block diagram that includes an example of MIMO equalizer and detector circuits in accordance with one embodiment.

FIG. 6 is block diagram 600 that illustrates an example of MIMO equalizer and detector circuits in accordance with one embodiment. It should be noted that the equalization-related components in the embodiment of FIG. 6 are substantially similar to those of FIG. 5, and therefore a description of those components is not repeated in connection with FIG. 6. As in the case of FIG. 5, in FIG. 6, Ni represents a number of inputs to the equalizer and No represents a number of outputs from the equalizer.

The embodiment of FIG. 6 additionally includes MIMO detection circuitry 602 in which adaptation is carried out with the help of a second LMS adaptation 612. The second LMS adaptation 612, which is described further below, employs constraints in a similar manner as the first LMS algorithm (512 of FIG. 5) described above. As can be seen in FIG. 6, MIMO detection circuitry 602 includes noise whitening filter 604, a mean table 606, an error covariance matrix 608 and a detector 610. MIMO equalizer output $y_k$ is input into whitening filter 604 and into detector 610. Symbols â(k) are also fed to whitening filter 604. Whitening filter 604 provides an output that is fed to summing node 616. An output $d_k$ of MIMO target 510 and symbols â(k) are fed to mean table 606 that responsively provides a noise bias vector μ that is fed to summing node 616. At summing node 616, the whitening filter 604 output and the noise bias vector μ are combined to provide an error $E_k$, which is fed to both LMS adaptation 612 (via feedback loop portion 614) and to error covariance matrix 608, which also receives symbols â(k). In response to receiving â(k) and $E_k$, error covariance matrix 608 outputs a noise covariance matrix Σ. As can be seen in FIG. 6, the whitening filter 604 output W, the noise bias vector μ and the noise covariance matrix Σ are input into detector 610. Detector 610 provides output $â_k$, which may be a best estimate of MIMO channel input symbols $a_k$. Constraints that may be introduced into LMS adaptation 612 are denoted by reference numeral 618 in FIG. 6. Examples of such constraints are described further below.

In the example embodiment of FIG. 6, a SISO DDNP branch metric is extended to MIMO and takes the form $$J(W,\mu,\Sigma;\gamma) = \tfrac{1}{2}\log(|\Sigma(\gamma)|) + \tfrac{1}{2}\mathrm{Trace}[E(W(\gamma)Y_k - \mu(\gamma))\Sigma^{-1}(W(\gamma)Y_k - \mu(\gamma))^T] \qquad \text{Equation 31}$$

where $$\Sigma(\gamma) = E[W(\gamma)(-D_k + Y_k - \eta(\gamma))(-D_k + Y_k - \eta(\gamma))^T W^T(\gamma)] \qquad \text{Equation 32}$$

is the covariance matrix of the whitened noise component $$E_k(\gamma) = W(\gamma)(-D_k + Y_k - \eta(\gamma)) = W(\gamma)Y_k - \mu(\gamma) \qquad \text{Equation 33a}$$

with $$D_k = (d_k^T \ldots d_{k-L}^T)^T \qquad \text{Equation 33b}$$

$$Y_k = (y_k^T \ldots y_{k-L}^T)^T \qquad \text{Equation 33c}$$

$$d_k = GA_k \qquad \text{Equation 33d}$$

$$y_k = FX_k \qquad \text{Equation 33e}$$

$$\mu(\gamma) = W(\gamma)(D_k + \eta(\gamma)) \qquad \text{Equation 33f}$$

$$\eta(\gamma) = E(-D_k + Y_k) \qquad \text{Equation 33g}$$

and $W(\gamma)$ is a vector of the whitening filter coefficients and is expressed as $$W(\gamma) = (w_0 w_1 \ldots w_L) \qquad \text{Equation 34}$$

From the above equations, it is seen that the whitening filter $W(\gamma)$, the noise bias vector $\mu(\gamma)$, and the noise covariance matrix $\Sigma(\gamma)$ all depend on the transition bit pattern $\gamma$ at time k being used ($\gamma = a_k a_{k-1} \ldots a_{k-M}$, where M is the channel memory). Therefore, the training of the DDNP parameters $W(\gamma)$, $\mu(\gamma)$, and $\Sigma(\gamma)$ may be performed adaptively using the LMS algorithm $$W^{(k)}(\gamma) = W^{(k-1)}(\gamma) + \sigma_w\left(-\frac{\partial J(W,\mu,\Sigma;\gamma)}{\partial W(\gamma)}\right) \qquad \text{Equation 35a}$$

$$\mu^{(k)}(\gamma) = \mu^{(k-1)}(\gamma) + \sigma_\mu\left(-\frac{\partial J(W,\mu,\Sigma;\gamma)}{\partial \mu(\gamma)}\right) \qquad \text{Equation 35b}$$

$$\Sigma^{(k)}(\gamma) = \Sigma^{(k-1)}(\gamma) + \sigma_\Sigma\left(-\frac{\partial J(W,\mu,\Sigma;\gamma)}{\partial \Sigma(\gamma)}\right) \qquad \text{Equation 35c}$$

where $\sigma_w$, $\sigma_\mu$, and $\sigma_\Sigma$ are step sizes associated with the DDNP parameters $W(\gamma)$, $\mu(\gamma)$, and $\Sigma(\gamma)$, respectively. The gradients of the functional J(.) are given by (the computation of gradients is performed after dropping the expected value operator)

$$\frac{\partial J(W,\mu,\Sigma;\gamma)}{\partial W(\gamma)} = 2\Sigma^{-1}(\gamma)E_k(\gamma)Y_k^T \qquad \text{Equation 36a}$$

$$\frac{\partial J(W,\mu,\Sigma;\gamma)}{\partial \mu(\gamma)} = -2\Sigma^{-1}(\gamma)E_k(\gamma) \qquad \text{Equation 36b}$$

$$\frac{\partial J(W,\mu,\Sigma;\gamma)}{\partial \Sigma(\gamma)} = \frac{1}{2}\Sigma^{-1}(\gamma) - \frac{1}{2}\Sigma^{-1}(\gamma)E_k(\gamma)E_k^T(\gamma)\Sigma^{-1}(\gamma) \qquad \text{Equation 36c}$$

The branch metric criterion given by Equation 31 may be minimized subject to $w_0=I$ or subject to $\det(w_0)=1$. For the constraint $w_0=I$, the update of W takes place without the adaptation of the leading tap $w_0$, and for the constraint $\det(w_0)=1$, a second criterion given by $$L(w_0) = (\det(w_0) - 1)^2 \qquad \text{Equation 37}$$

is minimized with respect to W in a manner similar to the minimization carried out for the equalizer described above in connection with FIG. 5.

When constraint $w_0=I$, adaptation Equations 35b and 35c may be used as they are (in an unaltered form). However, in Equation 35a, the leading tap $w_0$ is excluded from the adaptation. This is obtained after replacing Equations 36a-

36c into Equations 35a-35c, considering iteration-dependent pattern $\gamma_k$, and using $S(\gamma_k)=\Sigma^{-1}(\gamma_k)$ $$\tilde{W}^{(k)}(\gamma_k)=\tilde{W}^{(k-1)}(\gamma_k)-\sigma_w S^{(k-1)}(\gamma_k)E_k(\gamma_k)\tilde{Y}_k^T \quad \text{Equation 38a}$$

$$\mu^{(k)}(\gamma_k)=\mu^{(k-1)}(\gamma_k)+\sigma_\mu S^{(k-1)}(\gamma_k)E_k(\gamma_k) \quad \text{Equation 38b}$$

$$\Sigma^{(k)}(\gamma_k)=\Sigma^{(k-1)}(\gamma_k)+\sigma_\Sigma(S^{(k-1)}(\gamma_k)E_k(\gamma_k)E_k^T(\gamma_k)S^{(k-1)}(\gamma_k)-S^{(k-1)}(\gamma_k)) \quad \text{Equation 38c}$$

where $\tilde{W}$ is the same as $W$ without the leading tap $w_0$, and $\tilde{Y}_k$ is the same as $Y_k$ without the leading component.

When constraint $\det(w_0)=1$, Equation 31 is minimized together with Equation 37, and the resulting adaptive expressions have the forms $$W^{(k)}(\gamma_k)=W^{(k-1)}(\gamma_k)-\sigma_w S^{(k-1)}(\gamma_k)E_k(\gamma_k)Y_k^T \quad \text{Equation 39a}$$

$$\mu^{(k)}(\gamma_k)=\mu^{(k-1)}(\gamma_k)+\sigma_\mu S^{(k-1)}(\gamma_k)E_k(\gamma_k) \quad \text{Equation 39b}$$

$$\Sigma^{(k)}(\gamma_k)=\Sigma^{(k-1)}(\gamma_k)+\sigma_\Sigma(S^{(k-1)}(\gamma_k)E_kE_k^T S^{(k-1)}(\gamma_k)-S^{(k-1)}(\gamma_k)) \quad \text{Equation 39c}$$

$$w_0^{(k)}(\gamma_k)= \quad \text{Equation 39d}$$
$$w_0^{(k-1)}(\gamma_k)+\sigma_{w0}\left(-\frac{\partial L(w_0)}{\partial w_0}\right)_{w_0=w_0^{(k-1)}}=w_0^{(k-1)}(\gamma_k)-$$
$$\sigma_{w0}(\det(w_0^{(k-1)}(\gamma_k))-1)\det(w_0^{(k-1)}(\gamma_k))w_0^{-T(k-1)}(\gamma_k)$$

where $\sigma_{w0}$ is a step size associated with the adaptation of $w_0$.

At each iteration of Equations 39a-39d, the leading tap of $W$ in Equation 39a is replaced by its update from Equation 39d to ensure that $\det(w_0)$ remains very close to 1 in accordance with the constraint.

The two adaptive algorithms given by Equations 38a-38c and Equations 39a-39d use the inverse of the error covariance matrix $S(\gamma_k)=\Sigma^{-1}(\gamma_k)$, which increases the complexity of these algorithms. One technique to avoid this problem is to scale the gradients given by Equations 36a-36c using the positive-definite matrix $\Sigma(\gamma_k)$. With such a scaling, the Equations of these gradients are modified to become $$\frac{\partial J'(W,\mu,\Sigma;\gamma)}{\partial W(\gamma)}=2E_k(\gamma)Y_k^T \quad \text{Equation 40a}$$

$$\frac{\partial J'(W,\mu,\Sigma;\gamma)}{\partial \mu(\gamma)}=-2E_k(\gamma) \quad \text{Equation 40b}$$

$$\frac{\partial J'(W,\mu,\Sigma;\gamma)}{\partial \Sigma(\gamma)}=\frac{1}{2}\Sigma(\gamma)-\frac{1}{2}E_k(\gamma)E_k^T(\gamma) \quad \text{Equation 40c}$$

Using the new Equations 40a-40c for the gradients, the two adaptive algorithms given by Equations 38a-38c and Equations 39a-39d take new forms in which the inverse matrix $S(\gamma_k)$ is not used. Thus, for the algorithm with the constraint $w_0=I$, the new form is given by $$\tilde{W}^{(k)}(\gamma_k)=\tilde{W}^{(k-1)}(\gamma_k)-\sigma_w E_k(\gamma_k)\tilde{Y}_k^T \quad \text{Equation 41a}$$

$$\mu^{(k)}(\gamma_k)=\mu^{(k-1)}(\gamma_k)+\sigma_\mu E_k(\gamma_k) \quad \text{Equation 41b}$$

$$\Sigma^{(k)}(\gamma_k)=\Sigma^{(k-1)}(\gamma_k)+\sigma_\Sigma(E_k(\gamma_k)E_k^T(\gamma_k)-\Sigma^{(k-1)}(\gamma_k)) \quad \text{Equation 41c}$$

and for the algorithm with the constraint $\det(w_0)=1$, the new form is $$W^{(k)}(\gamma_k)=W^{(k-1)}(\gamma_k)-\sigma_w E_k(\gamma_k)Y_k^T \quad \text{Equation 42a}$$

$$\mu^{(k)}(\gamma_k)=\mu^{(k-1)}(\gamma_k)+\sigma_\mu E_k(\gamma_k) \quad \text{Equation 42b}$$

$$\Sigma^{(k)}(\gamma_k)=\Sigma^{(k-1)}(\gamma_k)+\sigma_\Sigma(E_k(\gamma_k)E_k^T(\gamma_k)-\Sigma^{(k-1)}(\gamma_k)) \quad \text{Equation 42c}$$

$$w_0^{(k)}(\gamma_k)= \quad \text{Equation 42d}$$
$$w_0^{(k-1)}(\gamma_k)+\sigma_{w0}\left(-\frac{\partial L(w_0)}{\partial w_0}\right)_{w_0=w_0^{(k-1)}}=w_0^{(k-1)}(\gamma_k)-$$
$$\sigma_{w0}(\det(w_0^{(k-1)}(\gamma_k))-1)\det(w_0^{(k-1)}(\gamma_k))w_0^{-T(k-1)}(\gamma_k)$$

The above description in connection with FIG. 6 provides details of LMS adaptation 612 that is utilized to compute parameters used for detector circuitry 602. It should be noted that, although FIG. 6 shows LMS adaptation 612 and does not include LMS adaptation 512 (of FIG. 5), both LMS adaptations 512 and 612 may be employed in a same MIMO channel.

Figure 7:
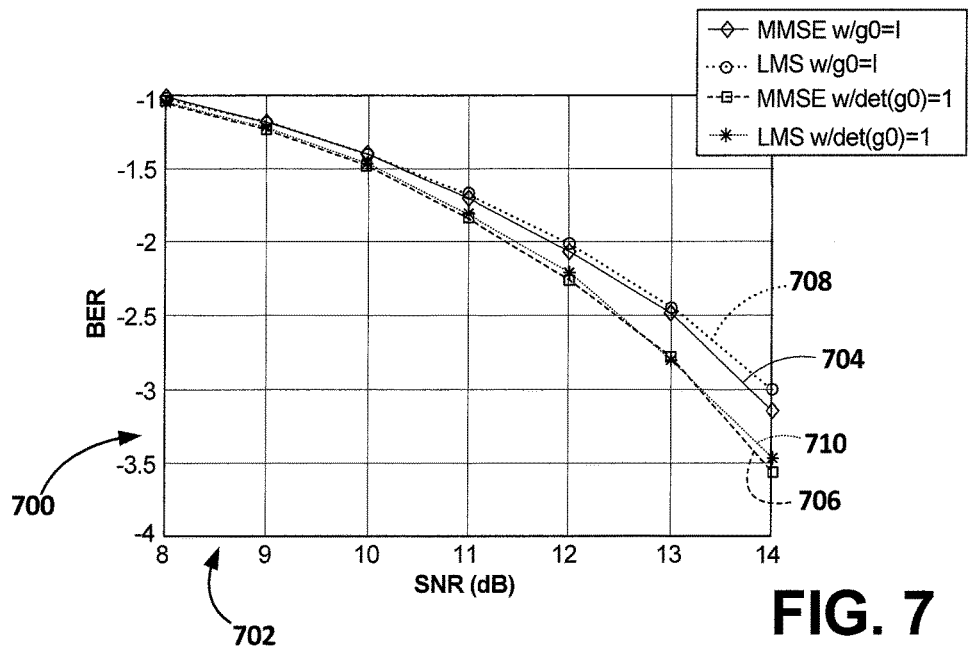
FIGS. 7-10 are graphs of experimental results.
Figure 8:
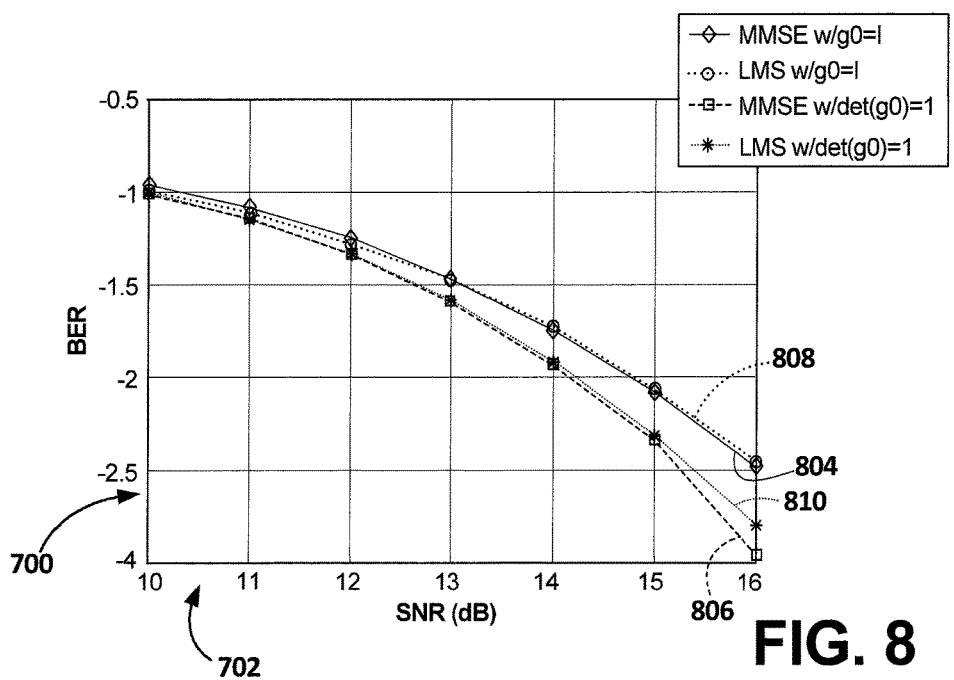
Figure 9:
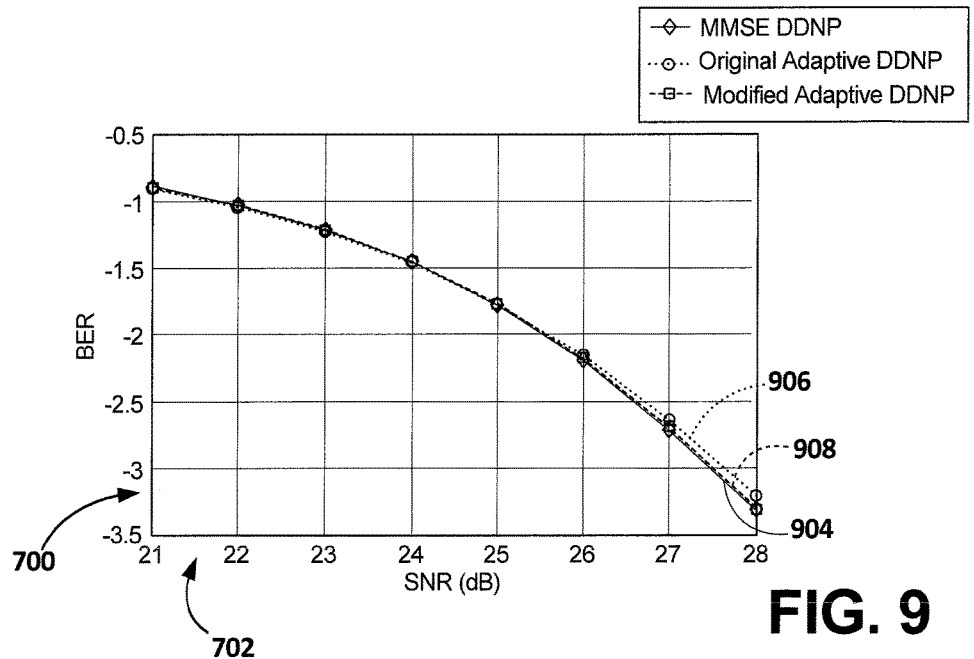
Figure 10:
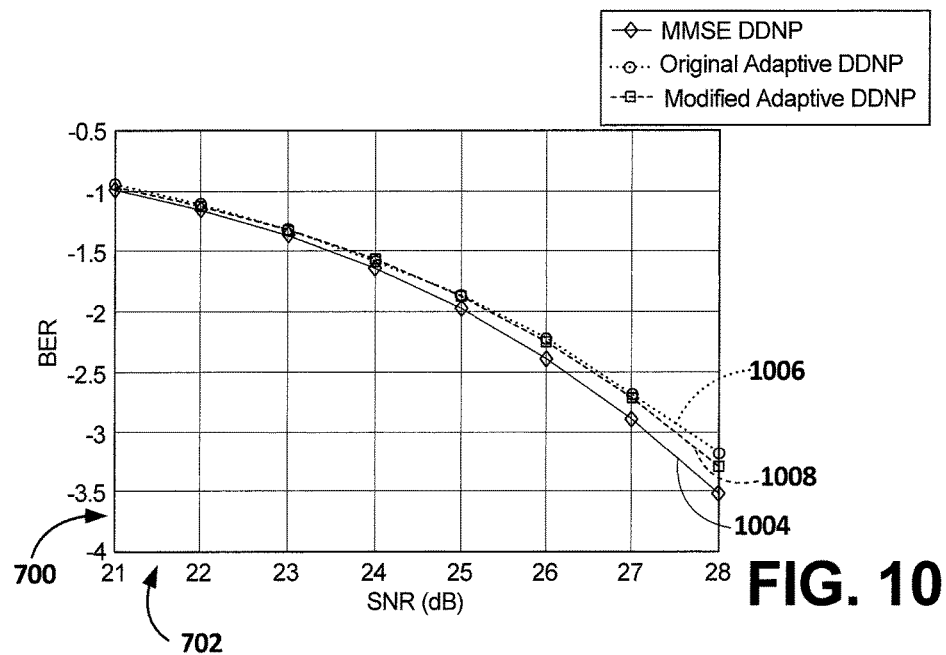

Experiments were carried out to test the adaptive MIMO GPR equalizer adaptation (e.g., 512 of FIG. 5) and the adaptive MIMO DDNP adaptation (e.g., 612 of FIG. 6) using both constraints $\det(g_0)=1$ and $g_0=I$ for the equalizer and the constraint $\det(w_0)=1$ for the DDNP training. Two cases were considered in the experiments—1) Ni=No=2 and 2) Ni=No=3. FIG. 7 and FIG. 8 illustrate test results using cases 1 and 2 for the equalizer, and FIG. 9 and FIG. 10 illustrate test results using cases 1 and 2 for the DDNP training. For each case, bit-error rate (BER) curves for a Wiener/MMSE solution together with the corresponding adaptive solution using the aforementioned constraints, are plotted. In each of FIGS. 7-10, vertical axis 700 represents BER and horizontal axis 702 represents signal-to-noise ratio (SNR) in decibels (dB).

FIG. 7 illustrates BER plots for a MIMO GPR equalizer with two inputs and two outputs using MMSE and LMS algorithms with constraints $g_0=I$ and $\det(g_0)=1$. In FIG. 7, plots 704 and 706 are MMSE plots for $g_0=I$ and $\det(g_0)=1$, respectively. Plots 708 and 710 are corresponding LMS algorithm plots for $g_0=I$ and $\det(g_0)=1$, respectively.

FIG. 8 illustrates BER plots for a MIMO GPR equalizer with three inputs and three outputs using MMSE and LMS algorithms with constraints $g_0=I$ and $\det(g_0)=1$. In FIG. 8, plots 804 and 806 are MMSE plots for $g_0=I$ and $\det(g_0)=1$, respectively. Plots 808 and 810 are corresponding LMS algorithm plots for $g_0=I$ and $\det(g_0)=1$, respectively.

FIG. 9 illustrates BER plots for a MIMO channel with two inputs and two outputs using MMSE and original and modified LMS algorithms for DDNP training with constraint $\det(w_0)=1$. In FIG. 9, plot 904 is an MMSE plot, and plots 906 and 908 are original and modified LMS algorithm plots, respectively.

FIG. 10 illustrates BER plots for a MIMO channel with three inputs and three outputs using MMSE and original and modified LMS algorithms for DDNP training with constraint $\det(w_0)=1$. In FIG. 10, plot 1004 is an MMSE plot, and plots 1006 and 1008 are original and modified LMS algorithm plots, respectively.

The plots of FIGS. 7-10 show that the BERs of the adaptive algorithms are close to their corresponding Wiener/MMSE BERs especially for the case with Ni=No=2. Also, from FIGS. 9 and 10, it is seen that the modified adaptive algorithm for DDNP given by Equations 42a-42d, in addition to being more efficient, appears to be more robust and easy to converge than its original adaptive version given by Equations 39a-39d. Further, it should be noted that the use of the constraint $\det(w_0)=1$ for the DDNP filters ensures that the covariance matrices of the residual errors will be scaled identity matrices, which simplifies their implementation.

The above embodiments are primarily described in connection with hard disk drives. However, those embodiments may be employed in other devices/applications in which ISI may be present. For example, the above-described embodiments may be useful for MIMO wireless communication in which ISI is present. Further, as areal densities increase, ISI may become a problem in data storage devices that currently may not have substantial ISI. An example of one such data storage device in which the above embodiments may be useful is provided below.

Figure 11:
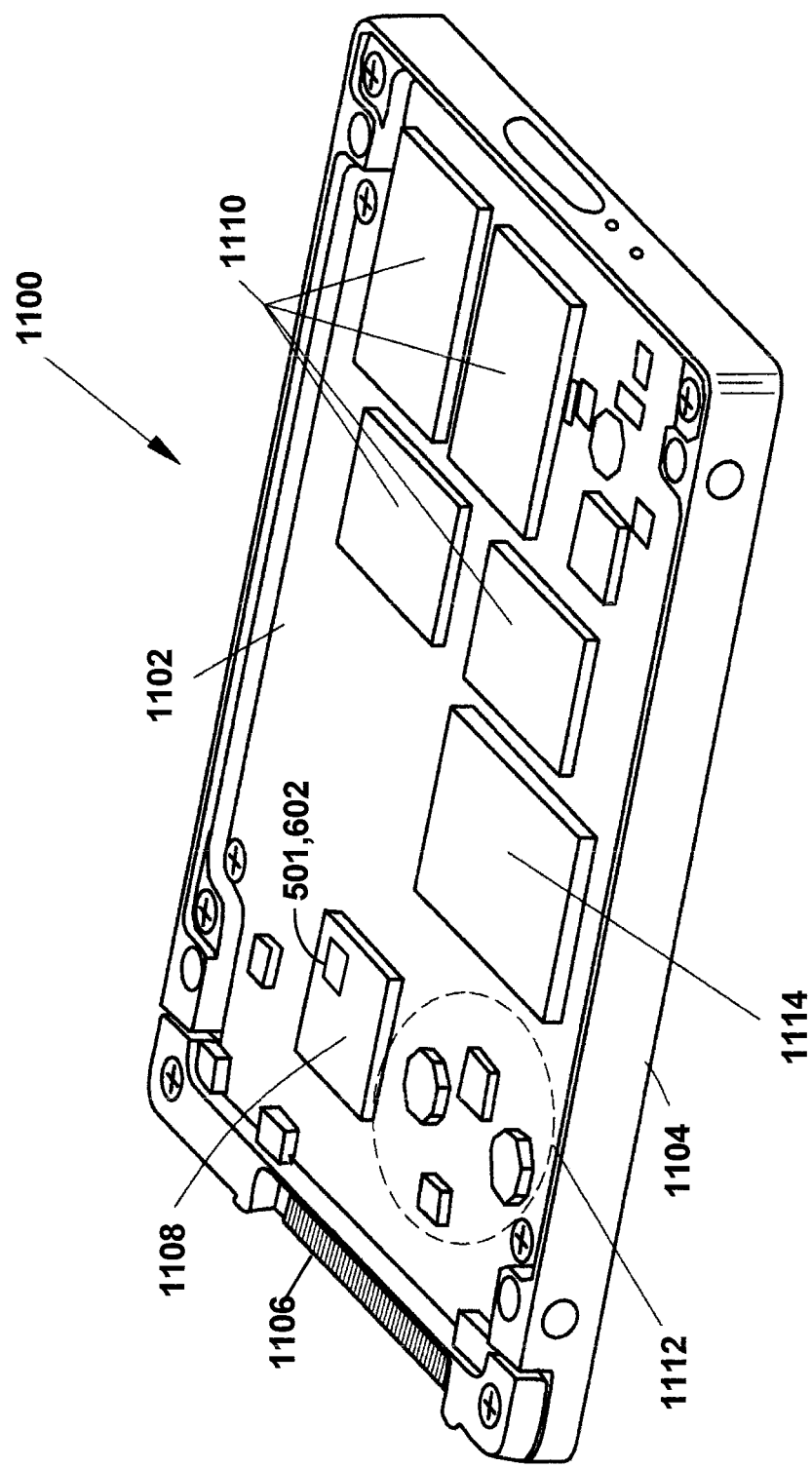
FIG. 11 is an isometric view of a solid-state drive that employs equalization and detection techniques in accordance with one embodiment.

FIG. 11 illustrates an oblique view of a solid state drive (SSD) 1100 in accordance with one embodiment, which includes equalizer and detector circuits of the type shown in FIGS. 5 and 6, for example. SSD 1100 includes one or more circuit card assemblies 1102 and typically includes a protective, supportive housing 1104, a top cover (not shown), and one or more interface connectors 1106. SSD 1100 further includes a controller ASIC 1108, one or more non-volatile memory devices 1110, and power regulation circuitry 1112. The memory devices 1110 are essentially the SSD's data storage media. SSD 1100 may include erasure blocks as the physical storage locations within memory device 1110, which may include Flash memory devices, for example. In some applications, SSD 1100 further includes a power-backup energy storage device, such as a super-capacitor 1114.

In accordance with certain aspects, the SSD 1100 includes the circuit card assembly 1102 that includes a connector 1106 for connection to a host computer (not shown). In accordance with certain aspects, the connector 1106 includes a NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer.

In SSD 1100, ASIC controller 1108 may include equalization circuitry 501 and/or detection circuitry 602 described above. In such an embodiment, ASIC controller 1108 and circuits 501 and 602 may be a single ASIC (e.g., a SOC). In some embodiments, components of circuits 501 and 602 may comprise one or more ICs that are separate from ASIC controller 1108. In some embodiments, circuits 501 and 602 may comprise program code that is stored in a memory within controller ASIC 1108. The program code may be executed by a microprocessor within controller ASIC 1108.

Data form a host computer (not shown in FIG. 11) is received in SSD 1100 via connector 1106. That received data is provided to drive controller ASIC 1108, which stores the data in one or more memory devices 1110. In response to a request by a host computer for data stored in SSD 1100, information read from memory device(s) 1110 to satisfy the request is processed by circuits 501 and 602 before it is sent from SSD 1100 to the host computer.

Figure 12:
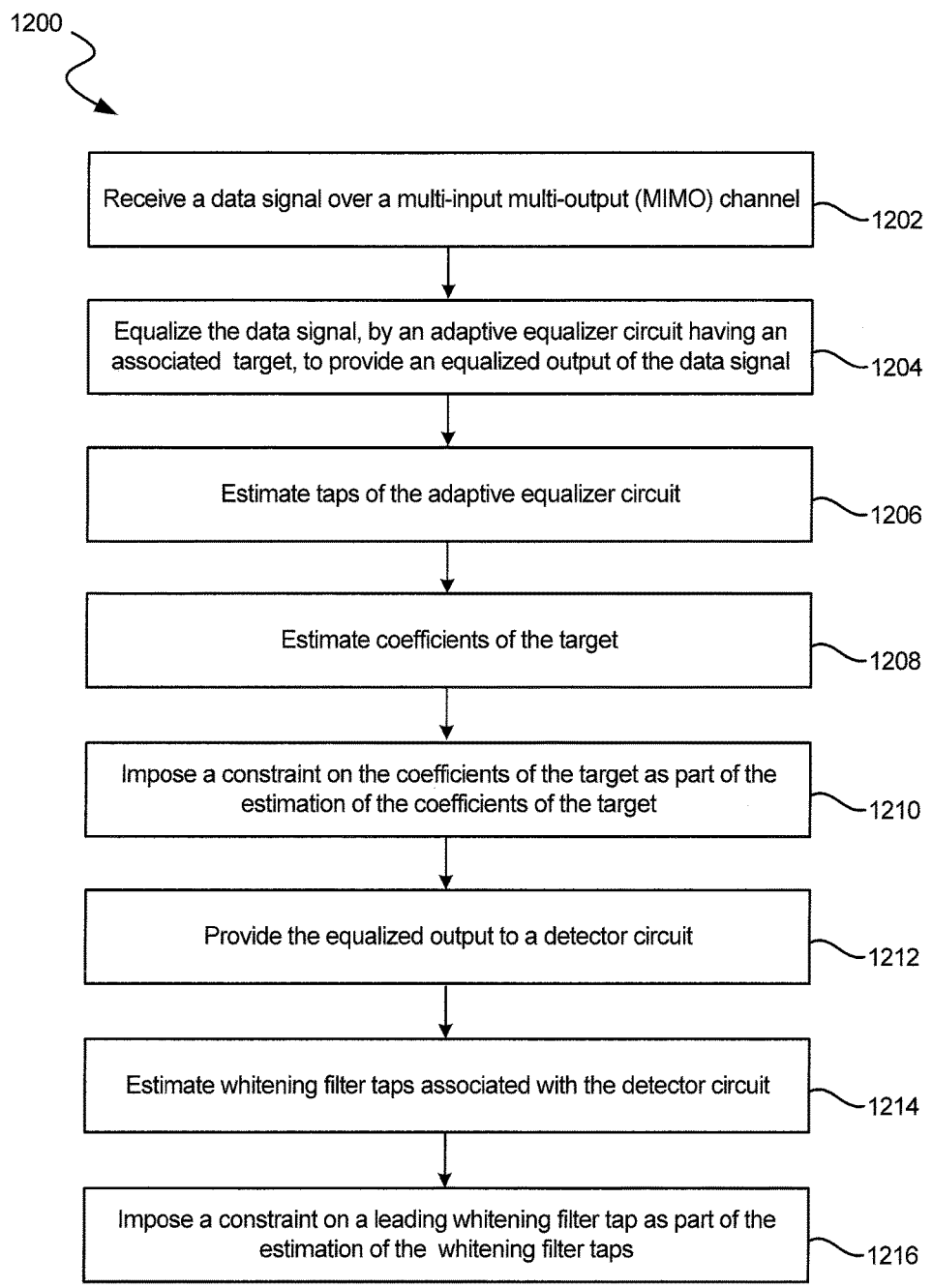
FIG. 12 is a flowchart of a method embodiment.

FIG. 12 is a flowchart 1200 of a method embodiment. The method includes receiving a data signal over a multi-input multi-output (MIMO) channel at step 1202. At step 1204, the data signal is equalized, by an adaptive equalizer circuit having an associated target, to provide an equalized output of the data signal. At step 1206, taps of the adaptive equalizer circuit are estimated. Coefficients of the target are estimated at step 1208. At step 1210, a constraint is imposed on the coefficients of the target as part of the estimation of the coefficients of the target. The method may further include providing the equalized output to a detector circuit at step 1212. At step 1214, whitening filter taps associated with the detector circuit may be estimated. At step 1216, a constraint on a leading whitening filter tap may be imposed as part of the estimation of the whitening filter taps.

In accordance with various embodiments, the equalization and detection methods described herein may be implemented as one or more software programs running on one or more computer processors or controllers, such as those included in devices 100 and 1100. Dedicated hardware implementations including, but not limited to, application specific ICs, programmable logic arrays and other hardware devices can likewise be constructed to implement the equalization and detection methods described herein. It should be noted that, although the above embodiments are described as including a DDNP-SOVA detector, the detector may be of type SOVA, BCJR (Bahl-Cocke-Jelinek-Raviv), or any other detector.

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a data signal over a multi-input multi-output (MIMO) channel;
   equalizing the data signal, by an adaptive equalizer circuit having an associated target, to provide an equalized output of the data signal;
   estimating taps of the adaptive equalizer circuit;
   estimating coefficients of the target;
   imposing a first constraint on the coefficients of the target as part of the estimation of the coefficients of the target;
   inputting true input symbols corresponding to the data signal into the target to obtain a desired response; and
   obtaining an equalization error based on the equalized output and the desired response.

2. The method of claim 1 and further comprising minimizing a mean square error functional of the equalization error subject to the first constraint on the coefficients of the target.

3. The method of claim 2 wherein the first constraint imposed on the coefficients of the target comprises a monic determinant constraint or a monic identity constraint.

4. The method of claim 1 and further comprising:
   providing the equalized output to a MIMO detector circuit; and
   obtaining detected symbols from the MIMO detector circuit.

5. The method of claim 4 wherein the MIMO detector circuit comprises a data-dependent noise prediction (DDNP) detector or a non-DDNP detector.

6. The method of claim 5 further comprising:
   estimating MIMO DDNP whitening filter taps associated with the MIMO detector circuit; and
   imposing a second constraint on a leading MIMO DDNP whitening filter tap as part of the estimation of the MIMO DDNP whitening filter taps.

7. The method of claim 6 wherein the second constraint imposed on the leading MIMO DDNP whitening filter tap comprises a monic determinant constraint or a monic identity constraint.

8. A data storage device comprising:
   a data storage medium;
   a multi-input multi-output (MIMO) read channel configured to process a data signal obtained from data stored on the data storage medium, the MIMO read channel comprises:
      an adaptive equalizer circuit having an associated target, the adaptive equalizer circuit is configured to provide an equalized output of the data signal;
      and
      channel control circuitry configured to:
         estimate taps of the adaptive equalizer circuit;
         estimate coefficients of the target;
         impose a first constraint on the coefficients of the target as part of the estimation of the coefficients of the target;
         receive true input symbols corresponding to the data signal into the target to obtain a desired response; and
         obtain an equalization error based on the equalized output and the desired response.

9. The data storage device of claim 8 wherein the MIMO read channel further comprises a detector circuit configured to receive the equalized output and responsively provide detected symbols.

10. The data storage device of claim 8 and wherein the detector circuit comprises a data-dependent noise prediction (DDNP) detector or a non-DDNP detector.

11. The data storage device of claim 10 wherein the channel control circuitry is further configured to:
    estimate MIMO DDNP whitening filter taps associated with the MIMO detector circuit; and
    impose a second constraint on a leading MIMO DDNP whitening filter tap as part of the estimation of the MIMO DDNP whitening filter taps.

12. A method comprising:
    receiving a data signal over a multi-input multi-output (MIMO) channel;
    equalizing the data signal, by an adaptive equalizer circuit having an associated target, to provide an equalized output of the data signal;
    providing the equalized output to a detector circuit;
    obtaining detected symbols from the detector circuit;
    estimating whitening filter taps associated with the detector circuit;
    imposing a second constraint on a leading whitening filter tap as part of the estimation of the whitening filter taps;
    estimating taps of the adaptive equalizer circuit;
    estimating coefficients of the target;
    imposing a first constraint on the coefficients of the target as part of the estimation of the coefficients of the target;
    inputting true input symbols corresponding the data signal into the target to obtain a desired response; and
    obtaining an equalization error based on the equalized output and the desired response.

13. The method of claim 12 wherein the second constraint imposed on the leading whitening filter tap comprises a monic determinant constraint or a monic identity constraint.

14. The method of claim 12 and further comprising minimizing a mean square error functional of the equalization error subject to the first constraint on the coefficients of the target.

15. The method of claim 14 and wherein the first constraint imposed on the coefficients of the target comprises a monic determinant constraint or a monic identity constraint.

* * * * *